Aug. 22, 1961  A. G. TALBERT  2,997,342
SPRING LOCKING MECHANISM FOR DUMP VEHICLES
Filed May 13, 1958  4 Sheets-Sheet 1

INVENTOR.
Austin G. Talbert,
BY
Cromwell, Greist & Warden
ATTYS.

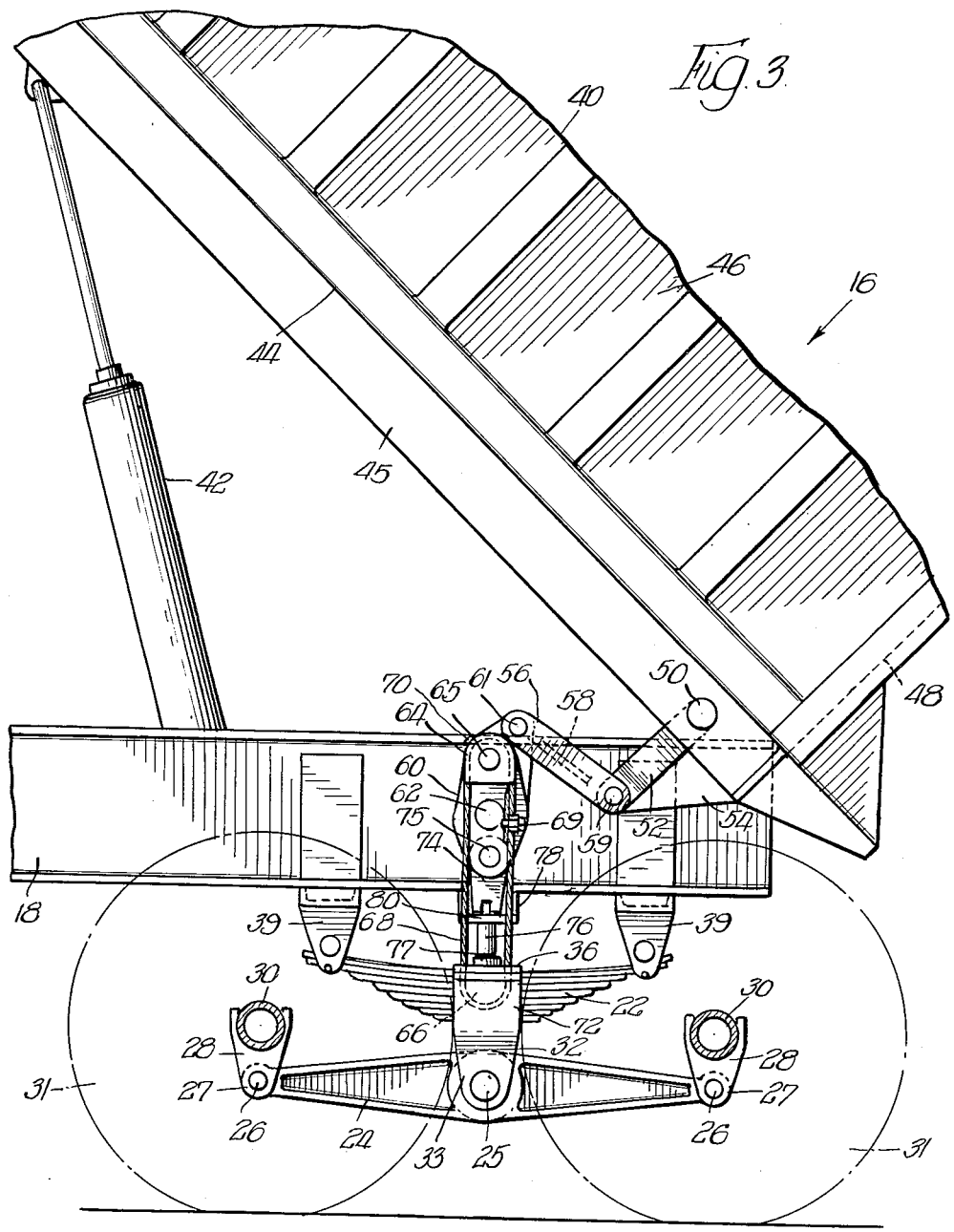

Aug. 22, 1961    A. G. TALBERT    2,997,342
SPRING LOCKING MECHANISM FOR DUMP VEHICLES
Filed May 13, 1958    4 Sheets-Sheet 3
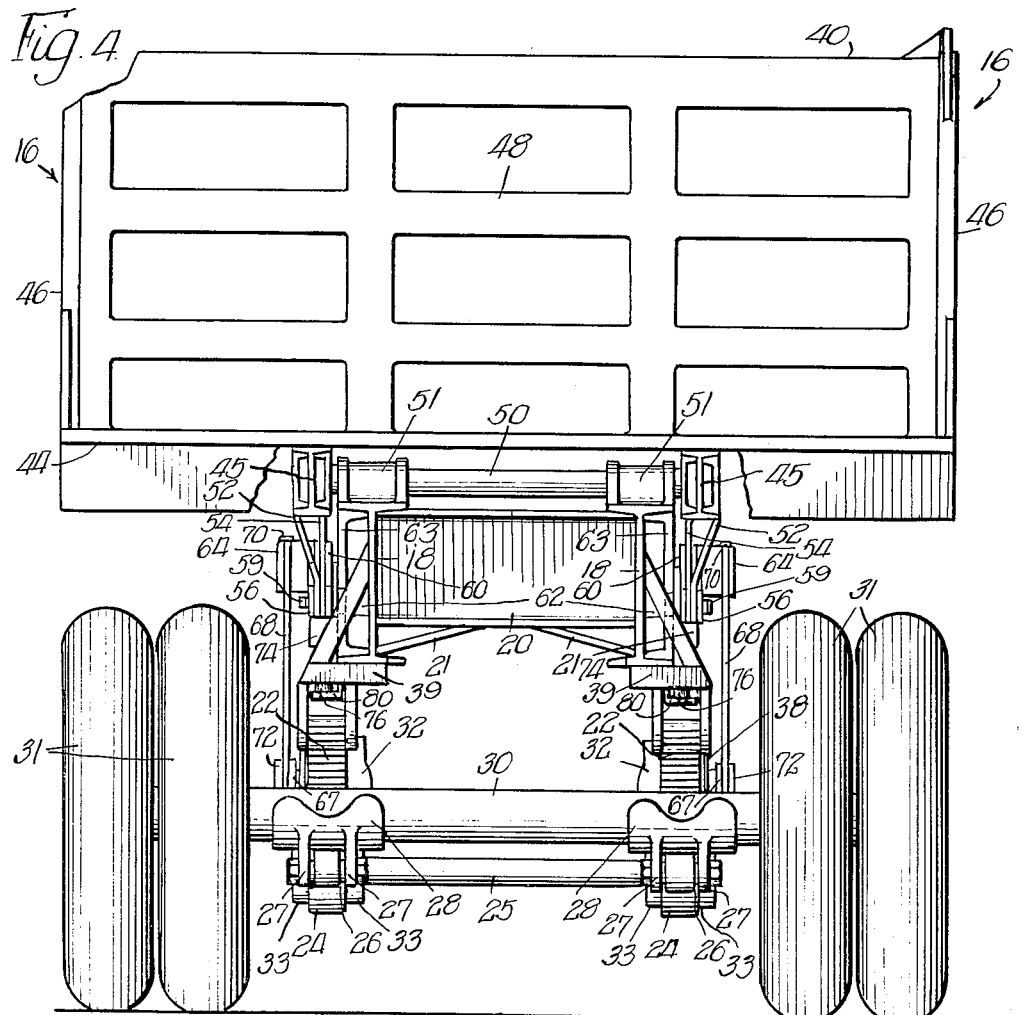
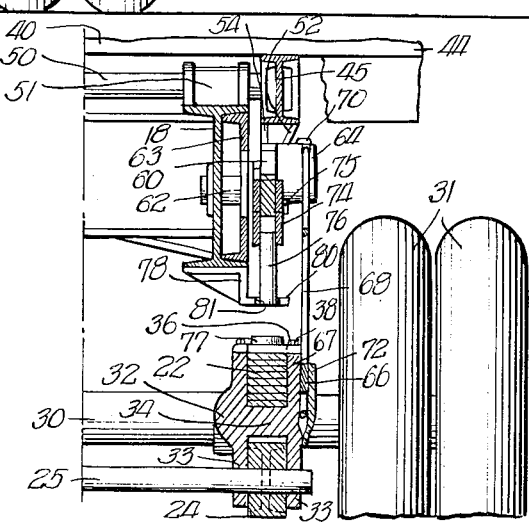
INVENTOR.
Austin G. Talbert,
BY
Cromwell, Greist & Warden
Attys Aug. 22, 1961  A. G. TALBERT  2,997,342
SPRING LOCKING MECHANISM FOR DUMP VEHICLES
Filed May 13, 1958  4 Sheets-Sheet 4
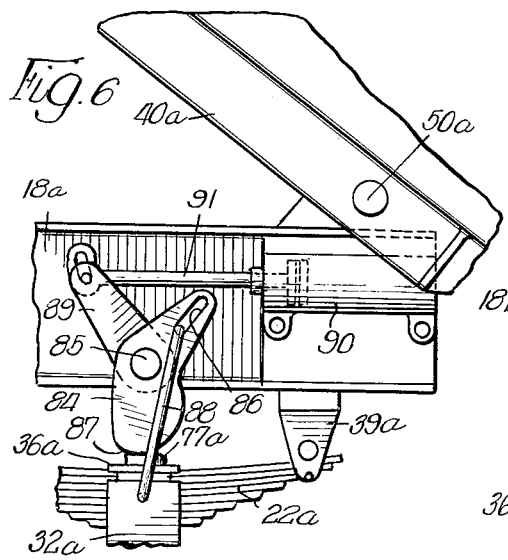
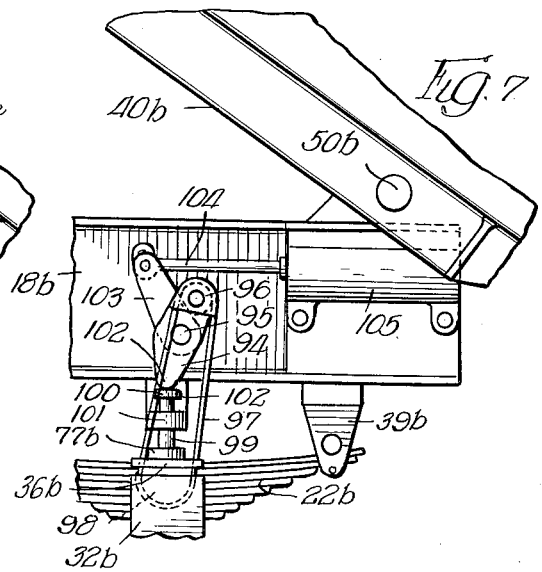
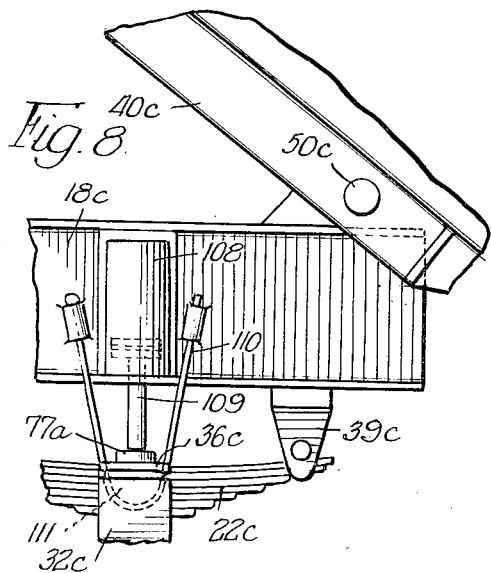
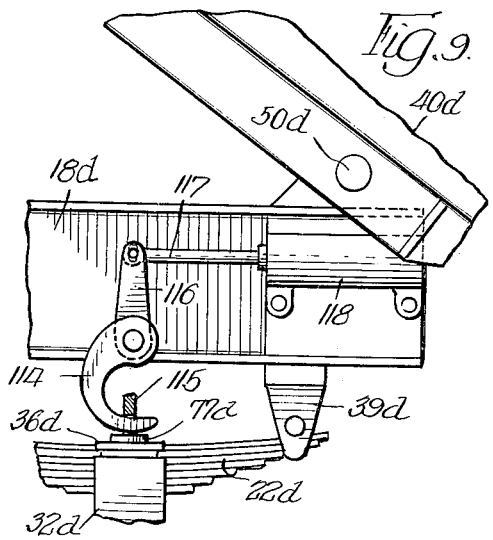
INVENTOR.
Austin G. Talbert,
BY
Cromwell, Greist & Warden
Attys.

United States Patent Office 2,997,342
Patented Aug. 22, 1961

2,997,342
SPRING LOCKING MECHANISM FOR DUMP VEHICLES
Austin G. Talbert, Lyons, Ill., assignor to Talbert Construction Equipment Company, Lyons, Ill., a corporation of Illinois
Filed May 13, 1958, Ser. No. 734,888
13 Claims. (Cl. 298—17)

This invention relates to a spring locking mechanism for dump vehicles.

In the use of dump vehicles, particularly long dump trailers of the type wherein the rearwardly tiltable body is pivotably mounted on a relatively narrow frame which in turn is resiliently supported in the usual manner between a pair of dual wheels of a tandem wheel-and-axle assembly, a hazardous condition often arises during dumping operations. When the body of such a dump vehicle is raised or elevated for the purpose of discharging a heavy load therefrom, the body is in a relatively unstable condition because the center of gravity is located well above the frame and the supporting springs are likely to allow the raised body to tilt toward one side or the other. This condition is particularly hazardous when the dump vehicle is located on uneven ground where the wheels on one side of the vehicle are higher than the wheels on the other side. Under such conditions only a very small movement toward either side may cause the vehicle to overturn.

It is the general object of the invention to provide a new and improved mechanism which substantially lessens the tendency of such dump vehicles to overturn when the body is raised during a dumping operation.

Another object of the invention is to provide a new and improved spring locking mechanism for dump vehicles which automatically locks out the spring mounting of the frame on the wheel-and-axle assembly during rearward tilting of the body so as to shift the fulcrums for lateral tilting of the body from the sides of the relatively narrow frame outwardly to the outer edges of the relatively widely spaced dual wheels whereby to provide a more stable support for the body when it is tilted rearwardly.

Another object of the invention is to provide a new and improved lateral stabilizing mechanism for dump vehicles having a rearwardly tiltable body which automatically locks out the spring mounting of the frame of the vehicle on the wheel-and-axle assembly during rearwardly tilting movement of the body yet which does not interfere in any way with the normal spring mounting of the frame on the wheel-and-axle assembly when the body is in a substantially horizontal load-transporting position.

A still further object of the invention is to provide a new and improved spring locking mechanism for dump vehicles which becomes operative during the first ten to fifteen degrees of lift of the rearwardly tiltable body whereby the body is fully stabilized against lateral tilting during a load-spreading operation when the body is normally not raised into its maximum tilting position.

A more detailed object of the invention is to provide a new and improved stabilizing mechanism for dump vehicles, which mechanism includes normally inoperative connecting means between the sides of the frame of the vehicle and the sides of the wheel-and-axle assembly, normally inoperative abutment means between the sides of the frame and the sides of the wheel-and-axle assembly, and means automatically operable upon rearward tilting movement of the body to render the connecting means and the abutment means operative whereby to prevent lateral tilting of the frame of the vehicle either way with respect to the wheel-and-axle assembly.

Another object of the invention is to provide a spring locking mechanism of the character described which is simple and economical to produce, which may readily be installed upon either new or existing dump vehicles, which is simple yet effective in operation, and which requires little or no maintenance.

While the foregoing statements are indicative in a general way of the nature of the invention, other more specific objects and advantages will be apparent to those skilled in the art upon a full understanding of the construction, arrangement and purpose of the features of novelty incorporated in the new spring locking mechanism for dump vehicles.

In the accompanying drawings five embodiments of the invention are illustrated by way of exemplification but it will, of course, be appreciated that the invention is susceptible of incorporation in still other forms coming equally within the spirit of the invention and the scope of the appended claims.

In the drawings:

FIG. 3 is a fragmentary side elevational view similar to FIG. 2 with the tiltable body shown in its fully raised dumping position and the spring locking mechanism in its operable condition;

FIG. 4 is a partially broken rear end elevational view of the dump trailer of FIGS. 2 and 3 with the body in its horizontal load-transporting position as shown in FIG. 2;

FIG. 5 is a fragmentary vertical sectional view taken generally on the line 5—5 of FIG. 2;

FIG. 6 is a fragmentary side elevational view similar to FIG. 3 showing a modification of the invention in its operable condition;

FIG. 7 is a fragmentary side elevational view similar to FIG. 3 showing another modification of the invention in its operable condition;

FIG. 8 is a fragmentary side elevational view similar to FIG. 3 showing still another modification of the invention in its operable condition; and FIG. 9 is a fragmentary side elevational view similar to FIG. 3 showing a still further modification of the invention in its operable condition.

Figure 1:
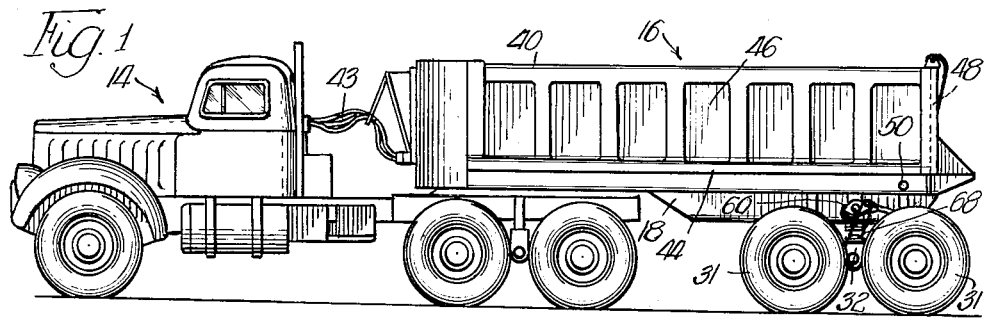
FIG. 1 is a side elevational view of a dump trailer having a rearwardly tiltable body stabilized against lateral tilting during a dumping operation in accordance with the invention.

In FIG. 1 of the drawings, a materials-transporting vehicle of a well known type is shown which comprises a truck tractor indicated generally at 14 and a dump trailer indicated generally at 16 which has its rear end supported on wheels and its forward end connected to the rear end of the truck tractor in a well known manner. The dump trailer, as shown in greater detail in FIGS. 2 to 4 inclusive, includes a main frame which is formed of a pair of laterally spaced, longitudinally extending I-beams 18 and a series of transverse beams 20 and cross braces 21 secured between the I-beams 18. The rear end of the main frame is resiliently supported on opposite sides by sets or piles of leaf springs 22 associated with a tandem wheel-and-axle assembly of a conventional type.

Figure 2:
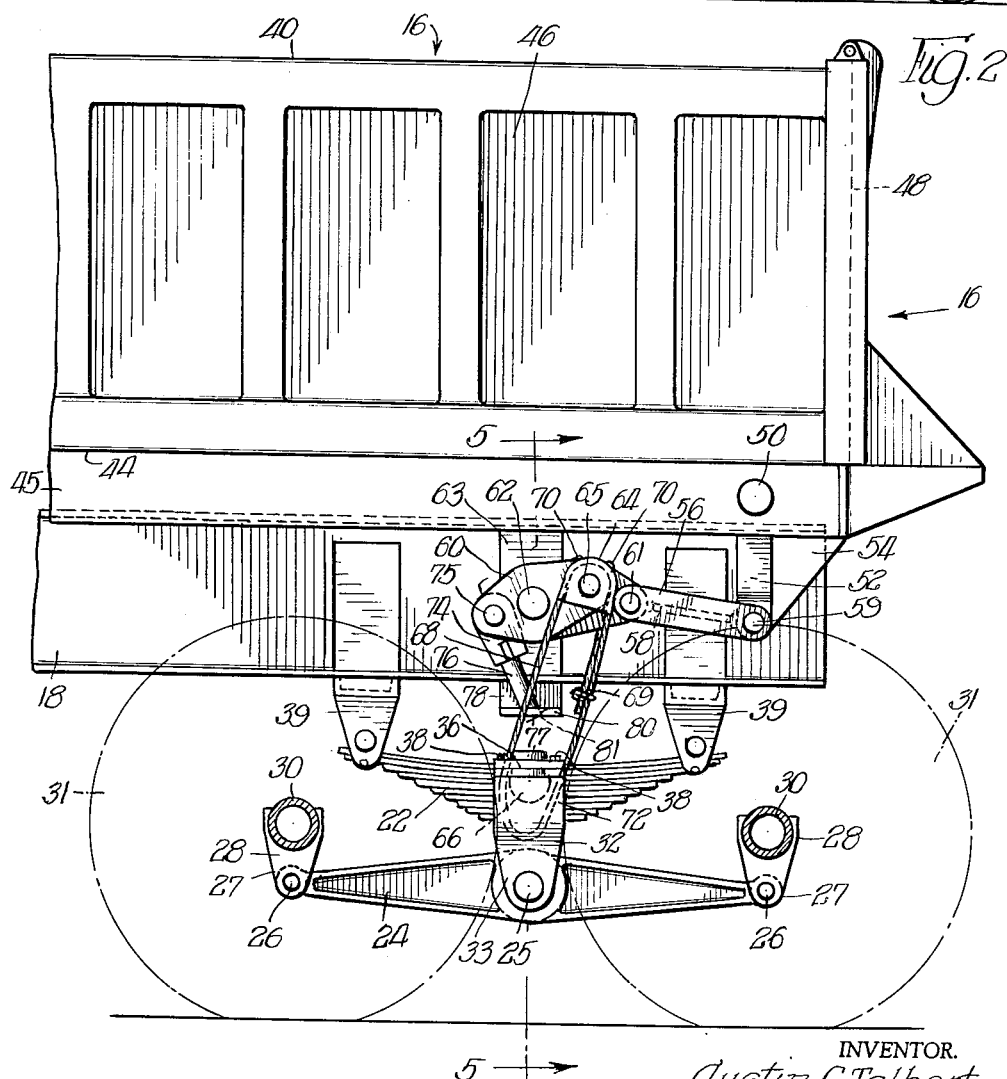
FIG. 2 is an enlarged fragmentary side elevational view of the rear end of the dump trailer shown in FIG. 1 with the wheels on the near side of the trailer removed and the wheels on the far side of the trailer indicated by broken lines, showing the tiltable body in a horizontal load-transporting position and the spring locking mechanism in its inoperative condition.

The wheel-and-axle assembly shown is of the type which has an equalizing beam 24 on each side pivotally mounted at the center upon a main axle 25. Bushings 26 are pivotally mounted on opposite ends of the equalizing beams 24 and are supported between spaced arms 27 of axle-hanger brackets 28 secured to and depending from axle housings 30 associated with dual wheels 31. A generally H-shaped saddle 32 is provided at each side of the wheel-and-axle assembly with the depending legs 33 thereof extending on opposite sides of each equalizing beam 24 and being pivotally mounted on the main axle 25. The center of each of the sets of springs 22 is supported on the cross member 34 of each of the H-shaped saddles 32 and is secured thereto by a cover plate 36 and shackle bolts 38. The ends of each set of springs 22 are pivotally fastened to the main frame of the dump trailer 16 by means of brackets 39 welded to the I-beams 18. It will be understood that the structure shown in FIGS. 2 and 3 is duplicated on the opposite side of the dump trailer 16 as is evident in FIG. 4. The particular dump trailer frame, tandem wheel-and-axle assembly, and spring suspension therebetween which are shown in the drawings are typical and illustrative of those commonly in use and the details thereof do not form a part of the present invention.

A dump body 40 has its rear end pivotably connected to the rear end of the main frame of the trailer 16 and is tiltable rearwardly by a pair of hydraulic hoists 42 arranged side by side which are connected in a hydraulic circuit including a series of hydraulic conduits 43 extending between the truck tractor 14 and the dump trailer 16. The dump body 40 comprises a bottom or floor 44 supported on a series of laterally spaced, longitudinally extending beams 45 and the usual vertically extending side members 46 and openable tail gate 48. The particular tail gate shown is of the general type which is pivotably mounted at its upper corners between the side members of the dump body with its lower edge adapted to swing outwardly and upwardly to permit the discharge of a load of material from the dump body when the body is tilted rearwardly. The dump body is pivotally connected to the rear end of the main frame of the trailer 16 by means of a rock shaft 50 which is secured between the laterally spaced beams 45 of the dump body and which is journaled in a pair of bearing devices 51 of known type which are mounted on the top of the laterally spaced I-beams 18 of the main frame of the trailer.

When the dump body of a vehicle such as that shown in FIG. 1 is tilted upwardly and rearwardly through an angle which may approximate fifty-five degrees for the purpose of discharging a heavy load therefrom, the raised dump body is in a relatively unstable condition because the center of gravity is located well above the supporting frame and the springs upon which the frame is mounted are likely to allow the raised body to tilt toward one side or the other. Because of this condition, a hazardous problem arises as to the possibility of the dump vehicle overturning. The problem is emphasized when the dump vehicle is located on uneven ground, as is often the case, where the wheels on one side are higher than the wheels on the other side. As is evident in FIG. 4, such lateral tilting of the raised dump body under normal conditions would be about either of the springs 22 as a fulcrum. As is the usual case in dump vehicles of this type, the main frame of the trailer is relatively narrow and the two sets of springs 22 are spaced relatively close together so as to fit between the two sets of dual wheels 31. This construction thus normally provides a relatively narrow supporting base for the raised center of gravity of the elevated dump body. By locking the main frame of the trailer to the wheel-and-axle assembly when the body is tilted rearwardly, the fulcrums for lateral tilting of the raised body are shifted outwardly to the outer edges of the dual wheels 31 whereby to effectively stabilize the raised body against lateral tilting due to the substantially wider supporting base provided for the raised body.

Accordingly, a spring locking mechanism is provided of a type which automatically locks out the springs 22 as soon as the body 40 is tilted rearwardly yet which does not interfere in any way with the normal spring mounting of the frame when the body is in a substantially horizontal load-transporting position.

A preferred embodiment of the invention is shown in FIGS. 1 to 5 inclusive and comprises a pair of bracket members 52 and 54 secured to the underside of the supporting beams 45 of the dump body 40 and depending downwardly at right angles thereto in vertical alignment with the shaft 50. A link member 56 comprising a pair of laterally spaced arms interconnected by a transverse web 58 has its rearward end pivotally connected to the lower end of the brackets 52 and 54 by means of a pin 59 and has its forward end pivotally connected to one end of a somewhat elongated cam member 60 by means of a pin 61. The cam member 60 is secured on a horizontally extending stub shaft 62 which is rotatably supported in a pair of aligned bores formed respectively in the vertically extending portion of the I-beam 18 of the main frame of the trailer and in the vertically extending portion of a channel section 63 secured between the outer horizontal flange portions of the I-beam 18. The stub shaft 62 is positioned directly above the main axle 25. This structure is best shown in FIGS. 2 and 5. With this arrangement, rearward tilting movement of the dump body 40 during a dumping operation causes rotation of the cam member 60 in a counterclockwise direction as viewed in FIGS. 2 and 3.

To rigidly interconnect each side of the main frame of the trailer 16 to the tandem wheel-and-axle assembly thereof during a dumping operation, a normally slack, closed loop of cable or the like is provided which has its upper end looped over a semi-circular, grooved sheave member 64 which is rotatably mounted on a stub shaft 65 secured to the cam member 60 intermediate the supporting shaft 62 and the forward link pin 61 and its lower end looped under a semi-circular, grooved sheave member 66 which is secured, as by welding, to the outer surface of the upper leg portion 67 of the H-shaped saddle 32. In the embodiment shown in FIGS. 2 to 5 inclusive, a length of wire cable 68 is looped over the sheave members 64 and 66 and has its ends tightly secured together by a cable clamp 69 of known type. To retain the cable 68 in the grooves formed in the sheave members 64 and 66, a pair of arcuate clips 70 are welded over the top of the groove of the sheave member 64 while a flat plate 72 is secured, as by welding, against the outer surface of the sheave member 66 and has its lower end secured, as by welding, to the lower portion of the saddle 32.

With the dump body 40 in its horizontal load-transporting position and the cam member 60 in its position shown in FIG. 2, the cable 68 is slack and the lower end of it drops out of the groove in the sheave member 66, as shown in FIGS. 2 and 5, so as not to interfere with the normal spring mounting of the main frame on the wheel-and-axle assembly. However, when the dump body 40 is tilted rearwardly and the cam member 60 is rotated into its position shown in FIG. 3, the sheave member 64 is moved upwardly relative to the sheave member 66 so as to tighten the cable 68 between the sheave members 64 and 66 and rigidly connect the sides of the frame of the trailer to the wheel-and-axle assembly thereof.

A dump vehicle of the type disclosed herein is often used for spreading a load of material as well as for dumping a whole load at a particular location. In such material-spreading operations, it is common practice to elevate the dump body through an angle which is substantially less than the maximum angle of lift of the body and then to advance the vehicle along the path upon which the material is to be spread. As it is desirable to laterally stabilize the dump vehicle during such a spreading operation, the cam member 60 is so designed and the sheave member 64 so positioned thereon that the cable 68 will be substantially fully tightened during the first ten to fifteen degrees of elevation of the dump body 40.

The cable 68 when in a tightened condition acts to prevent lateral tilting movement of each side of the main frame of the dump trailer 16 away from the tandem wheel-and-axle assembly when the dump body 40 is in a raised position. To further laterally stabilize the dump vehicle, normally inoperable abutment means are provided to prevent lateral tilting movement of each side of the main frame of the dump trailer toward the tandem wheel-and-axle assembly when the dump body 40 is in a raised position. As best shown in FIGS. 2, 3 and 5, the abutment means comprises a socket member 74 which is pivotably mounted on a pin 75 carried on the end of the cam member 60 opposite from the end thereof carrying the link pin 61. A downwardly projecting abutment pin 76 is secured in the socket member 74 and is selectively engageable with a raised abutment 77 formed on the upper surface of the cover plate 36 which holds the springs 22 in the saddle 32.

When the dump body 40 is in its horizontal load-transporting position and the cam member 60 is in its position shown in FIG. 2, the abutment pin 76 is in a raised position above the raised abutment 77 so as not to interfere with the normal spring mounting of the main frame of the vehicle. However, when the cam member 60 is pivoted into its position as shown in FIG. 3 upon rearward tilting movement of the dump body 40, the pin 76 is moved downwardly into abutting engagement with the raised abutment 77 as shown in FIG. 3 so as to prevent lateral tilting of either side of the main frame toward the tandem wheel-and-axle assembly when the dump body 40 is in a raised position. To provide a guide for the pin 76, a bracket 78 is secured to the underside of the I-beam 18 and has a horizontally extending flange 80 with a hole 81 bored therein through which the pin 76 moves.

The combination connecting and abutment mechanism disclosed herein is normally inoperative when the dump body 40 is in a horizontal load-transporting position so as not to interfere in any way with the normal spring mounting of the trailer on its wheel-and-axle assembly but becomes operative automatically upon rearward tilting of the dump body 40 by means of the link member 56 connected between the dump body 40 and the pivotable cam member 60. When the mechanism becomes operative, it effectively locks out the spring mounting of the frame of the trailer on the wheel-and-axle assembly and substantially increases the lateral stability of the dump vehicle when the body is in a raised dumping position, as previously explained herein. Obviously, a hydraulic device of known type could be utilized in place of the link member 56 to rotate the cam member 60 automatically upon rearward tilting of the dump body 40.

In another embodiment of the invention shown in FIG. 6, a dump body 40a is pivotably connected by means of a rock shaft 50a to the main frame of a dump vehicle including an I-beam 18a which is mounted on springs 22a of a wheel-and-axle assembly by means of a spring-hanger bracket 39a. The springs 22a are supported in a saddle 32a which is provided with a cover plate 36a having a raised abutment 77a formed thereon. The preceding structure is basically the same as the environmental structure of the embodiment shown in FIGS. 2 to 5 inclusive. A bell crank member 84 is secured intermediate its ends on a horizontally disposed stub shaft 85 which is rotatably mounted in the vertical portion of the I-beam 18a. The bell crank member 84 has an elongated slot 86 formed in one end and a cam surface 87 formed on its other end. An elongated rod 88 has its lower end bent and pivotally mounted in an opening in the side of the saddle 32a and its upper end bent and slidably confined in the slot 86. The bell crank member 84 is adapted to be rotated, by means of a crank arm 89 secured to the shaft 85, in a counterclockwise direction (as viewed in FIG. 6) into the position shown in FIG. 6 whereby the cam surface 87 abuttingly engages the raised abutment 77a and the rod 88 is placed under tension as a result of the upper end thereof engaging the lower end of the slot 86. This action obviously prevents lateral movement of each side of the frame of the dump vehicle either toward or away from the saddle 32a of the wheel-and-axle assembly. When the crank arm 89 is rotated in a clockwise direction the cam surface 87 is raised above the abutment 77a and the upper end of the rod 88 becomes loose in the slot 86 so that the spring locking mechanism does not interfere in any way with the normal spring mounting of the frame of the vehicle on the wheel-and-axle assembly thereof.

In this embodiment, the crank arm 89 is adapted to be rotated by a hydraulic cylinder-and-piston device 90 which is secured to the I-beam 18a in a horizontal position and which has a piston rod 91 connected to the arm 89 by means of a pin-and-slot connection. The cylinder-and-piston device 90 is connected in a well known manner in the hydraulic system of the vehicle so that it is actuated automatically upon rearward tilting movement of the dump body 40a.

Three additional embodiments of the invention are shown in FIGS. 7, 8 and 9. For convenience, elements thereof which are identical to elements of the embodiment of FIG. 6 will be identified by the same reference numerals with the suffixal letter $a$ being replaced, respectively, by suffixal letters $b$, $c$, and $d$.

In the embodiment of FIG. 7, a cam member 94 which is carried on a rotatable shaft 95 is provided with a sheave member 96 at one end thereof. In a manner similar to that shown in the embodiment of FIGS. 1 to 5 inclusive, a closed loop of cable 97 is passed over the sheave member 96 and under a sheave member 98 secured to the side of the saddle 32b so that the cable 97 is tightened when the cam member 94 is rotated in a counterclockwise direction (as viewed in FIG. 7) to the position shown in FIG. 7. An abutment pin 99 is freely movable in a vertical direction through a bore formed in a horizontal flange portion 101 of a bracket 102 which depends from the I-beam 18b. The length of the pin 99 is substantially greater than the length of the bore and a head portion 100 is formed on the pin 99 to prevent the pin from dropping out of the bore. When the cam member is rotated into the position shown in FIG. 7, the end 102 thereof opposite from the sheave member 96 engages the head portion 100 of the abutment pin 99 and forces the pin downwardly into abutting engagement with the raised abutment 77b on the cover plate 36b.

When the cam member 94 is rotated in a clockwise direction (as viewed in FIG. 7), the cable 97 is slackened and the abutting end 102 of the cam member is raised above the pin 99 so that the pin is free to move vertically relative to the flange 101. The cam carrying shaft 95 is rotated by means of a crank arm 103 having one end secured thereto, the other end of the crank arm being connected by a pin-and-slot connection to the end of a piston rod 104 of a hydraulic piston-and-cylinder device 105 mounted on the I-beam 18b. The piston-and-cylinder device 105 is connected in a hydraulic circuit in a well known manner so that it is actuated upon rearward tilting movement of the dump body 40b to move the piston rod 104 to the position shown in FIG. 7 whereby the cable 97 is tightened and the end 102 of the cam member 94 abuts against the raised abutment 77b through the pin 99 to effectively lock out the spring mounting of the dump vehicle and prevent lateral tilting of the frame of the vehicle relative to the wheel-and-axle assembly thereof.

In the embodiment of FIG. 8, a hydraulic cylinder-and-piston device 108 is secured to the I-beam 18c of the frame of a dump vehicle in a vertically extending position with a piston rod 109 thereof extending downwardly toward the raised abutment 77c of the saddle 32c. When the cylinder-and-piston device 108 is actuated upon rearward tilting of the dump body 40c, the piston rod 109 is shifted downwardly into abutting engagement with the raised abutment 77c and acts to force the frame of the vehicle in an upward direction away from the wheel-and-axle assembly whereby to tighten a normally slack cable 110 which has its ends secured to the I-beam 18c on opposite sides of the cylinder-and-piston device 108 and its intermediate portion looped below a sheave member 111 secured to the saddle 32c. When the dump body 40c is in its horizontal position, the piston rod 109 is moved upwardly out of abutting engagement with the abutment 77c and the cable 110 is slackened so that the normal spring mounting of the vehicle is not interfered with.

The embodiment of FIG. 9 comprises a curved hook member 114 rotatably mounted on the I-beam 18d and a ring-like keeper member or eye 115 mounted on the cover plate 36d of the saddle 32d directly below the hook member. The hook member 114 is adapted to be rotated by a crank arm 116 operably connected thereto and having its other end connected by a pin-and-slot connection to the end of a piston rod 117 of a hydraulic cylinder-and-piston device 118 mounted on the I-beam 18d. Upon rearward tilting of the body 40, the cylinder-and-piston device 118 is automatically actuated to rotate the hook member 114 downwardly into hooked engagement with the keeper member 115, as shown in FIG. 9, whereby to prevent movement of the sides of the frame either toward or away from the wheel-and-axle assembly. Obviously the normal spring mounting of the frame is not interfered with when the body 40d is in its horizontal load-transporting position and the hook member 114 is rotated upwardly into its normal position free of engagement with the keeper member 115.

I claim:

1. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for preventing the rear end of the frame from tilting laterally relative to the wheel-and-axle assembly when the center of gravity of the body is raised in tilting the body rearwardly, said means comprising normally slack closed loop cables interconnected between the sides of the frame and the sides of the wheel-and-axle assembly, and means for tightening said cable connections when the body is tilted rearwardly.

2. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for stabilizing the frame against lateral tilting relative to the wheel-and-axle assembly when the body is tilted rearwardly, said means comprising a cam member rotatably mounted on each side of the frame, an abutment pin carried on each cam member adjacent one end thereof and extending downwardly toward but normally not into engagement with a portion of the wheel-and-axle assembly, and means responsive to rearward tilting of the body for pivoting said cam members whereupon said abutment pins are moved downwardly into engagement with said portions of the wheel-and-axle assembly to prevent movement of either side of the frame toward the wheel-and-axle assembly.

3. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for stabilizing the frame against lateral tilting relative to the wheel-and-axle assembly when the body is tilted rearwardly, said means comprising a cam member rotatably mounted on each side of the frame, a sheave-like member carried at one end of each cam member, a normally slack loop of cable at each side of the frame, each loop having its upper end passing over said sheave-like member and its lower end passing underneath a portion of the wheel-and-axle assembly, and means responsive to rearward tilting of the body for pivoting said cam members whereupon said loops of cable are tightened to prevent movement of either side of the frame away from the wheel-and-axle assembly.

4. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for stabilizing the frame against lateral tilting relative to the wheel-and-axle assembly when the body is tilted rearwardly, said means comprising a cam member rotatably mounted on each side of the frame, an abutment pin carried on each cam member adjacent one end thereof and extending downwardly toward but normally not into engagement with a portion of the wheel-and-axle assembly, a sheave-like member carried adjacent the other end of each cam member, a normally slack loop of cable at each side of the frame, each loop having its upper end passing over said sheave-like member and its lower end passing underneath a portion of the wheel-and-axle assembly, and means responsive to rearward tilting of the body for pivoting said cam members whereupon said abutment pins are moved downwardly into engagement with said portions of the wheel-and-axle assembly to prevent movement of either side of the frame toward the wheel-and-axle assembly and said loops of cable are tightened to prevent movement of either side of the frame away from said assembly.

5. Stabilizing means of the character described in claim 4 wherein said means responsive to rearward tilting of the body comprises a linkage interconnected between the body and said cam member.

6. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means at each side of the frame for stabilizing the frame against lateral tilting relative to the wheel-and-axle assembly when the body is tilted rearwardly, each of said means comprising a cam rotatably mounted on the side of the frame generally above the wheel-and-axle assembly, a normally slack, looped element extending beneath a portion of the wheel-and-axle assembly and over a portion of the cam, and link means connected between the vehicle body and said cam, said link means being operable upon rearward tilting of the body to pivot said cam in a direction whereby said looped element is tightened to prevent movement of said side of the frame away from the wheel-and-axle assembly.

7. In a dump vehicle of the type having a wheel-and-axle assembly at the rear end thereof including at least one pair of dual wheels at each side of the vehicle, a relatively narrow frame which is disposed between said wheels and is resiliently supported at its rear end on said wheel-and-axle assembly, a dump body which is pivoted at its rear end to the rear end of the frame and which has a width extending between the outer edges of said wheels, wherein the body is tiltable rearwardly to a dumping position from a horizontal load-transporting position, and wherein the resilient mounting of the frame permits lateral tilting thereof about its side edges, as fulcrums, when the body is in its load-transporting position, the provision of means for locking the frame to the wheel-and-axle assembly when the body is tilted rearwardly to laterally stabilize the vehicle when the center of gravity of the body is raised by effectively shifting the fulcrums for lateral tilting of the frame outwardly from the edges of the frame to the outer edges of the wheels, said means comprising normally slack means connected between the sides of the frame and the wheel-and-axle assembly for preventing upward movement of the sides of the frame away from the wheel-and-axle assembly, normally non-engageable abutment means carried, respectively, on the sides of the frame and said assembly for preventing downward movement of the sides of the frame toward the wheel-and-axle assembly, and linkage means connected between the vehicle body and the frame-associated-portions of both said normally slack means and said normally non-engageable abutment means, said linkage means being operable upon rearward tilting of the body for tightening said connecting means and for causing positive engagement between said abutment means to lock the sides of the frame against movement away from and toward said wheel-and-axle assembly, respectively.

8. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means at each side of the frame for stabilizing the frame against lateral tilting relative to the wheel-and-axle assembly when the body is tilted rearwardly, said means comprising a bell crank rotatably mounted intermediate its ends on the side of the frame and normally disposed in a generally horizontal position, a crank arm operably connected to rotate said bell crank, means defining a longitudinally extending slot in one end of said bell crank, a rod member having its lower end pivotably connected to the wheel-and-axle assembly and its upper end slidably confined in said slot, said bell crank adapted to be rotated into a generally vertical position whereby said one end of said bell crank is rotated upwardly until the upper end of said rod engages the lower end of the now generally vertical slot and provides a tightened connection between the wheel-and-axle assembly and the frame of the vehicle and whereby the other end of said bell crank is rotated downwardly into abutting engagement with a portion of the wheel-and-axle assembly, and a hydraulic cylinder-and-piston device mounted on the side of the frame and having a piston rod operably connected to said crank arm, said cylinder-and-piston device adapted to be actuated in response to rearward tilting of said body to rotate said bell crank into its generally vertical position.

9. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means at each side of the frame for stabilizing the frame against lateral tilting relative to the wheel-and-axle assembly when the body is tilted rearwardly, said means comprising a cam member rotatably mounted on the side of the frame, a sheave member carried on one end of said cam member, a normally slack loop of cable having its upper end passing over said sheave member and its lower end passing underneath a portion of the wheel-and-axle assembly, an abutment pin freely slidable in a vertical bore formed in a horizontal flange portion of the frame disposed below said cam member, said pin having an enlarged head portion adapted to prevent the pin from falling out of the bore and having a length substantially greater than the length of the bore, a crank arm operably connected to rotate said cam member, and a hydraulic cylinder-and-piston device mounted on the side of the frame and having its piston rod connected to said crank arm, said cylinder-and-piston device adapted to be actuated automatically upon rearward tilting of the body to rotate said cam member in a direction whereby said one end thereof is rotated upwardly to tighten said cable and whereby the other end of said cam member is rotated downwardly into engagement with the head of said abutment pin to force said pin downwardly against a portion of the wheel-and-axle assembly.

10. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means at each side of the frame for stabilizing the frame against lateral tilting relative to the wheel-and-axle assembly when the body is tilted rearwardly, said means comprising a hydraulic cylinder-and-piston device vertically mounted on the side of the frame with the piston rod extending from the lower end of the cylinder and adapted to be shifted vertically toward and away from the wheel-and-axle assembly, and a length of cable having its ends secured to the frame on opposite sides of the cylinder-and-piston device and its intermediate portion normally passing loosely beneath a portion of the wheel-and-axle assembly, said cylinder-and-piston device adapted to be actuated upon rearward tilting of the body to move the piston rod downwardly against the wheel-and-axle assembly with sufficient force to move the frame and the wheel-and-axle assembly apart whereby to tighten said normally loose cable.

11. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for preventing the rear end of the frame from tilting laterally relative to the wheel-and-axle assembly when the center of gravity of the body is raised in tilting the body rearwardly, said means comprising a pair of connecting elements located at opposite sides of the vehicle and adapted for anchoring the sides of the vehicle frame to the wheel-and-axle assembly during rearward tilting of the body to its dumping position, each of said elements being interconnected between a side of the vehicle frame and the corresponding side of the wheel-and-axle assembly in a manner such that the normal resilient mounting of the vehicle frame on the wheel-and-axle assembly is not affected when the vehicle body is in its load-transporting position, pivotal cam means mounting portions of each of said connecting elements on the sides of the vehicle frame, and actuating means connected to said mounting means and automatically operable upon rearward tilting of the body for pivoting said cam means whereby to exert a tension force on said connecting elements and render said connecting elements effective to anchor the sides of the frame to the corresponding sides of the wheel-and-axle assembly.

12. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for stabilizing the frame against lateral tilting relative to the wheel-and-axle assembly when the center of gravity of the body is raised in tilting the body rearwardly, said means comprising a pair of abutment members at each side of the vehicle, which abutment members are disengaged when the body is in its load-transporting position and engaged when the body is in its dumping position whereby to prevent downward movement of each side of the frame toward the wheel-and-axle assembly, one abutment member of each pair being movably mounted on the side of the frame and the other being mounted on the wheel-andaxle assembly, a connecting element interconnected between each side of the frame and the corresponding side of the wheel-and-axle assembly, which connecting elements are in a loosened condition when the body is in its load-transporting position and in a tightened condition when the body is in its dumping position whereby to prevent upward movement of each side of the frame away from the wheel-and-axle assembly, and linkage means operably connected between the vehicle body and both the frame-associated-portions of said connecting elements and said abutment members movably mounted on said frame, said linkage means being adapted upon rearward tilting of the body into its dumping position to simultaneously cause engagement of said pairs of abutment members and tightening of said connecting elements to prevent movement of the sides of the frame toward and away from the wheel-and-axle assembly, respectively.

13. In a dump vehicle of the type having a frame which is resiliently supported at its rear end on a wheel-and-axle assembly and which is equipped with a body which is pivoted at its rear end to the rear end of the frame and is movable from a horizontally disposed load-transporting position to a rearwardly tilted dumping position, the provision of means for stabilizing the frame against lateral tilting relative to the wheel-and-axle assembly when the center of gravity of the body is raised in tilting the body rearwardly, said means comprising, normally disengaged abutment means carried, respectively, on the sides of the frame and on the sides of the wheel-and-axle assembly, normally slack means connected between the sides of the frame and the sides of the wheel-and-axle assembly, and a hydraulic cylinder-and-piston device mounted on the frame of the vehicle and operatively connected to the portions of said abutment means and normally slack connecting means associated with the frame of the vehicle, said hydraulic cylinder-and-piston device being operable upon rearward tilting movement of the body to its dumping position to simultaneously cause engagement of said abutment means to prevent movement of each side of the frame toward said assembly and tightening of said connecting means to prevent movement of each side of the frame away from said assembly.

References Cited in the file of this patent

UNITED STATES PATENTS

| | | |
|---|---|---|
| 1,523,549 | Lott | Jan. 20, 1925 |
| 1,544,233 | Igo | June 30, 1925 |
| 1,581,358 | Mayer | Apr. 20, 1926 |
| 1,610,881 | Reinsch | Dec. 14, 1926 |
| 1,690,040 | Sosdian | Oct. 30, 1928 |
| 1,975,119 | Oates | Oct. 2, 1934 |
| 2,020,489 | Walker et al. | Nov. 12, 1935 |

FOREIGN PATENTS

| | | |
|---|---|---|
| 364,120 | Germany | Jan. 8, 1921 |
| 474,059 | Germany | Apr. 22, 1928 |